(12) United States Patent  (10) Patent No.: US 8,977,391 B2
Vavrina et al.  (45) Date of Patent: Mar. 10, 2015

(54) SPACECRAFT DEVELOPMENT TESTBED SYSTEM

(75) Inventors: Matthew Aaron Vavrina, Seattle, WA (US); John Lyle Vian, Renton, WA (US)

(73) Assignee: The Boeing Company, Chicago, IL (US)

( * ) Notice: Subject to any disclaimer, the term of this patent is extended or adjusted under 35 U.S.C. 154(b) by 340 days.

(21) Appl. No.: 13/183,618

(22) Filed: Jul. 15, 2011

(65) Prior Publication Data

US 2013/0017838 A1  Jan. 17, 2013

(51) Int. Cl.
*G06F 19/00* (2011.01)
*B64G 7/00* (2006.01)

(52) U.S. Cl.
CPC .................... *B64G 7/00* (2013.01)
USPC ...... 700/245; 701/1; 701/36; 702/1; 702/108; 703/7; 703/8; 244/158.1

(58) Field of Classification Search
USPC ............. 700/245; 702/1, 108, 113, 127, 144, 702/187, 189; 701/1, 36; 703/7, 8; 244/158.1
See application file for complete search history.

(56) References Cited

U.S. PATENT DOCUMENTS

| 5,526,254 | A  | * | 6/1996  | Sato et al. ................. 700/56 |
| 6,553,328 | B1 | * | 4/2003  | Gold .......................... 702/108 |
| 6,684,182 | B1 | * | 1/2004  | Gold et al. ..................... 703/8 |
| 7,154,496 | B1 | * | 12/2006 | Engel et al. .................. 345/419 |
| 7,725,253 | B2 | * | 5/2010  | Foxlin ........................ 701/519 |
| 7,813,888 | B2 |   | 10/2010 | Vian et al. |
| 8,170,976 | B2 | * | 5/2012  | Dargue et al. ................ 706/47 |
| 8,370,124 | B1 | * | 2/2013  | Gold et al. ..................... 703/23 |
| 2004/0068415 | A1 | * | 4/2004 | Solomon ........................ 705/1 |
| 2004/0102946 | A1 | * | 5/2004 | Shahabuddin et al. ........ 703/22 |
| 2005/0230557 | A1 | * | 10/2005 | Aghili ....................... 244/158.1 |
| 2006/0027404 | A1 | * | 2/2006 | Foxlin ....................... 178/18.06 |
| 2008/0017759 | A1 | * | 1/2008 | Fussell et al. ............. 244/171.3 |
| 2008/0033684 | A1 | * | 2/2008 | Vian et al. .................... 702/113 |
| 2009/0150132 | A1 | * | 6/2009 | Gold et al. ..................... 703/8 |
| 2009/0157236 | A1 | * | 6/2009 | Van Gaasbeck et al. ........ 701/3 |
| 2010/0100520 | A1 | * | 4/2010 | Dargue et al. ................ 706/47 |
| 2011/0166836 | A1 | * | 7/2011 | Kaplan et al. ................. 703/2 |

OTHER PUBLICATIONS

Creamer et al., "The Spacecraft Robotics Engineering and Controls Laboratory", U.S. Naval Research Lab., Washington, D.C., pp. 1-6.

(Continued)

*Primary Examiner* — Khoi Tran
*Assistant Examiner* — Jaime Figueroa
(74) *Attorney, Agent, or Firm* — Yee & Associates, P.C.

(57) ABSTRACT

A method and apparatus comprising a location reference system and a control module. The location reference system is configured to generate location information for a number of mobile platforms in an environment. The control module is configured to receive the location information for the number of mobile platforms from the location reference system. The control module is further configured to generate command signals for the number of mobile platforms using the location information. The control module is further configured to send the command signals to the number of mobile platforms to operate the number of mobile platforms in the environment such that operation of the number of mobile platforms emulates the operation of a number of spacecraft systems in a non-Earth terrestrial environment.

20 Claims, 8 Drawing Sheets

(56) References Cited

OTHER PUBLICATIONS

Davis et al., "Aerospace Vehicle Motion Emulation Using Omnidirectional Mobile Platform", AIAA Guidance, Navigation and Control Conference and Exhibit, Aug. 2007, Hilton Head, SC, pp. 1-12.

Otero, "The SPHERES Satellite Formation Flight Testbed: Design and Initial Control", Department of Electrical Engineering and Computer Science, Massachusetts Institute of Technology, Aug. 2000, pp. 1-278.

Kelm et al., "FREND: Pushing the Envelope of Space Robotics", Space Research and Satellite Technology, 2008 NRL Review, pp. 239-241.

Creamer et al., "Laboratory Demonstration of a Prototype Geosynchronous Servicing Spacecraft", Space Reserach and Satellite Technology, 2006 NRL Review, pp. 1-3.

* cited by examiner

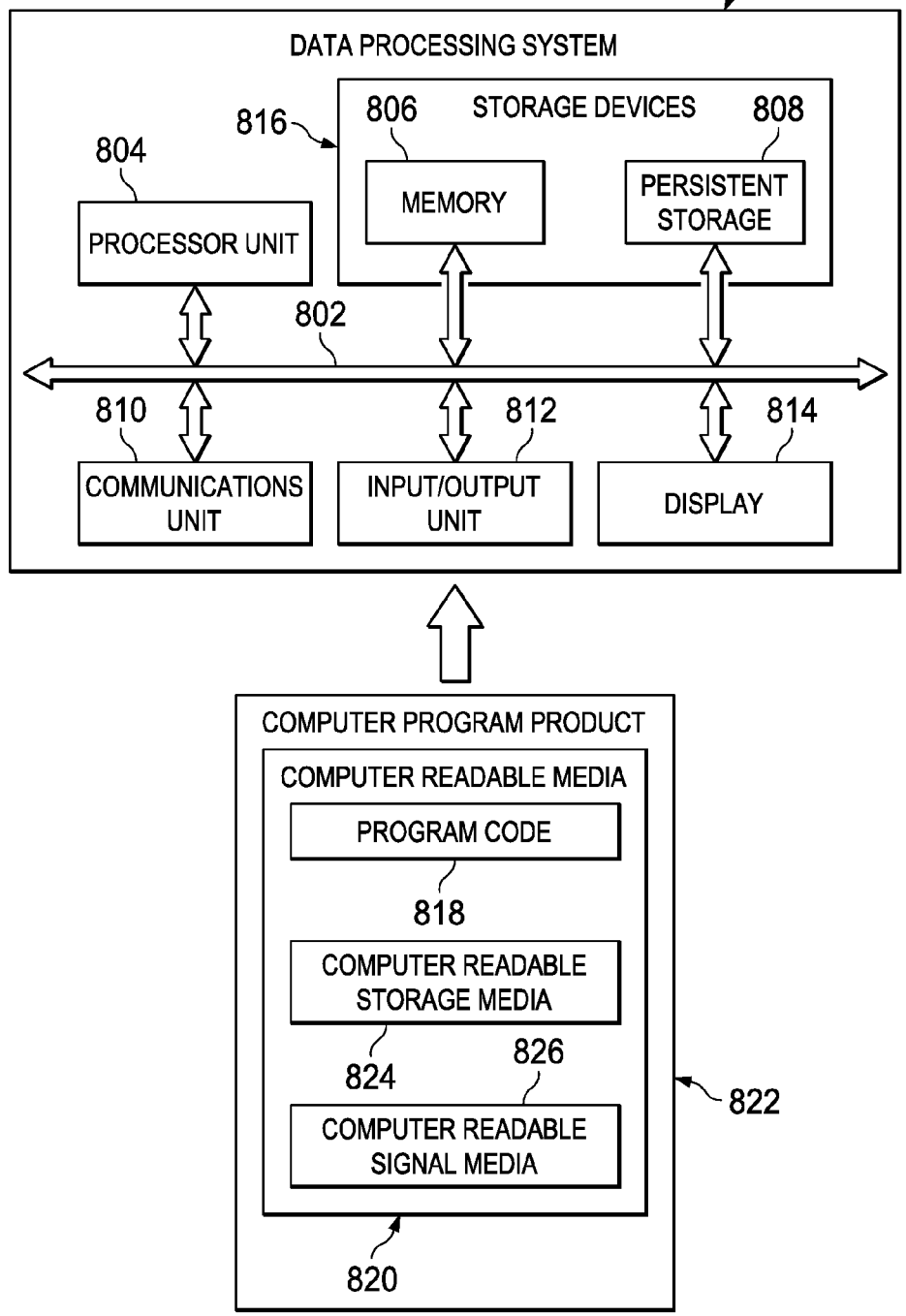

SPACECRAFT DEVELOPMENT TESTBED SYSTEM

BACKGROUND INFORMATION

1. Field

The present disclosure relates generally to the development and testing of vehicles and, in particular, to the development and testing of spacecraft systems.

2. Background

Currently-available methods for developing and testing vehicles, such as air, water, and land-based vehicles, typically involve both running computer simulations and testing prototypes. However, running computer simulations may be more time consuming than desired. Further, computer simulations may simplify many of the complexities of the actual system being tested.

Similarly, prototype testing may be more expensive than desired. For example, a prototype vehicle may only be capable of flying a limited number of hours and in a limited number of conditions due to factors, such as operating costs, logistical issues, safety regulations, flight regulations, and/or other factors.

A system that allows the development and testing of algorithms and configurations for vehicles to be performed more rapidly and accurately as compared to currently-available methods may be desirable. Further, a system that reduces the cost for the development and testing of algorithms and configurations for vehicles as compared to currently-available methods also may be desirable.

Therefore, it would be advantageous to have a method and apparatus that takes into account at least some of the issues discussed above, as well as possibly other issues.

SUMMARY

In one advantageous embodiment, an apparatus comprises a location reference system and a control module. The location reference system is configured to generate location information for a number of mobile platforms in an environment. The control module is configured to receive location information for the number of mobile platforms from the location reference system. The control module is further configured to generate command signals for the number of mobile platforms using the location information. The control module is further configured to send the command signals to the number of mobile platforms to operate the number of mobile platforms in the environment such that operation of the number of mobile platforms emulates operation of a number of spacecraft systems.

In another advantageous embodiment, a system for developing and testing a number of spacecraft systems comprises a number of mobile platforms, a location reference system, a health monitoring module, a control module, and a data management module. The number of mobile platforms is configured to operate within an environment to emulate operation of the number of spacecraft systems in a non-Earth terrestrial environment. The location reference system is configured to generate location information for the number of mobile platforms in an environment. The health monitoring module is configured to receive health monitoring information from the number of mobile platforms and to monitor a health condition for the number of mobile platforms using the health monitoring information received. The control module is configured to receive the location information for the number of mobile platforms from the location reference system. The control module is further configured to generate command signals for the number of mobile platforms using the location information and the health condition for the number of mobile platforms. The control module is further configured to send the command signals to the number of mobile platforms to operate the number of mobile platforms in the environment such that operation of the number of mobile platforms emulates the operation of the number of spacecraft systems in the non-Earth terrestrial environment. The data management module is configured to record the location information for the number of mobile platforms in the environment.

In yet another advantageous embodiment, a method for testing a number of spacecraft systems is provided. Location information is received for a number of mobile platforms in an environment. The location information is generated using a location reference system. Command signals are generated for the number of mobile platforms using the location information. The command signals are sent to the number of mobile platforms to operate the number of mobile platforms in the environment such that operation of the number of mobile platforms emulates operation of the number of spacecraft systems.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 8 is an illustration of a data processing system in accordance with an advantageous embodiment.

DETAILED DESCRIPTION

Figure 1:
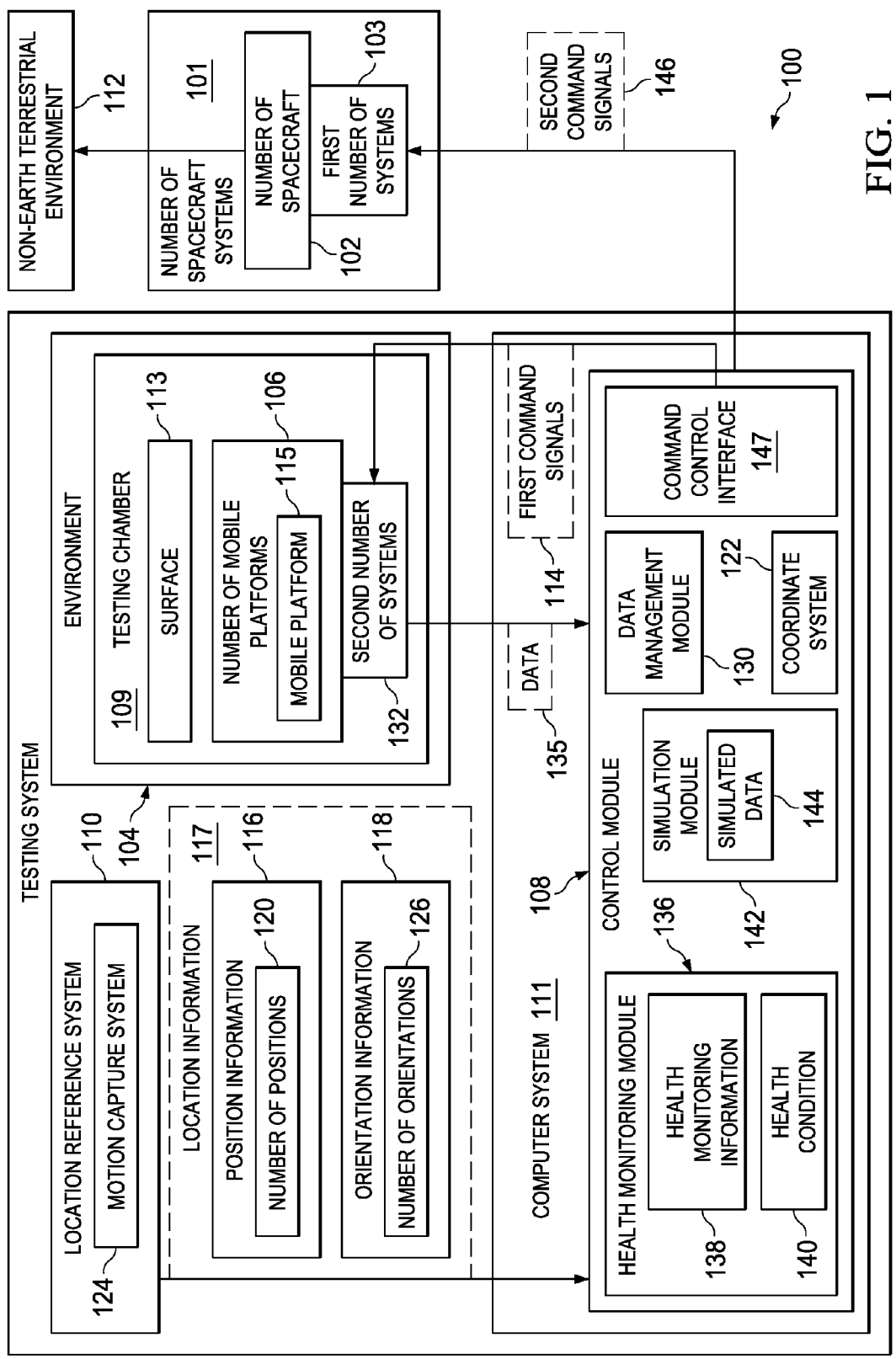
FIG. 1 is an illustration of a block diagram of a system for developing and testing spacecraft systems in accordance with an advantageous embodiment.

The different advantageous embodiments recognize and take into account one or more different considerations. For example, the different advantageous embodiments recognize and take into account that a system for the testing of space-based vehicles may need to consider different factors as compared to the development and testing of air, water, and/or land-based vehicles.

The different advantageous embodiments recognize and take into account that vehicles that are configured to operate in environments, such as outer space, microgravity, and other environments outside of the Earth's atmosphere, may operate in different conditions than vehicles configured to operate in air, in water, and/or on land. One definition for the boundary between Earth's atmosphere and outer space is the Kámán line. The Kámán line is a boundary line at an altitude of about 100 kilometers above the Earth's sea level.

The different advantageous embodiments recognize and take into account that when testing vehicles configured to operate in environments, such as, for example, environments outside of the Earth's atmosphere, the conditions of these environments may need to be taken into account. Space environments and effects may include, for example, without limitation, gravity conditions, atomic oxygen, solar electromagnetic effects, ionizing radiation, meteoroids and orbital debris, spacecraft-related contamination, and/or other conditions of the environments.

One example of a vehicle configured to operate in an environment outside of the Earth's atmosphere is a spacecraft. The different advantageous embodiments recognize and take into account that the conditions of the environment in which the spacecraft will be operating may affect operation of the various systems onboard the spacecraft. As a result, the different advantageous embodiments recognize and take into account that these conditions may need to be taken into account when testing the spacecraft and/or systems for the spacecraft.

The different advantageous embodiments also recognize and take into account that currently-available methods for testing a spacecraft and/or systems onboard the spacecraft may require launching the spacecraft into space. Testing may then be performed while the spacecraft is in orbit around the Earth. This type of testing may be referred to as on-orbit testing.

The different advantageous embodiments recognize and take into account that launching a spacecraft into space may take more time and/or effort than desired. For example, launches may not always occur as planned and may require rescheduling one or more times. Further, launches may require more time and/or effort than desired to ensure that the proper safety regulations are being followed before, during, and after each launch. The different advantageous embodiments also recognize and take into account that launching a spacecraft into space may be more expensive than desired.

Additionally, the different advantageous embodiments recognize and take into account that once a spacecraft is launched into space, performing testing of the spacecraft may be more difficult than desired. For example, retrieving data generated by systems onboard the spacecraft for use in testing may be more difficult than desired or take more time than desired. Further, once the spacecraft has been launched into space, physically retrieving the space-based vehicle to perform additional testing on the ground may be more difficult than desired.

The different advantageous embodiments recognize and take into account that currently-available solutions for testing spacecraft on the ground may use gantry-based and/or track-based test facilities. The different advantageous embodiments recognize and take into account that these types of facilities may allow only a limited number of vehicles to be tested at any given point in time.

The different advantageous embodiments also recognize and take into account that the sizes of the different types of spacecraft for which testing is performed may require a facility with a larger and/or more complicated physical infrastructure than desired. The different advantageous embodiments recognize and take into account that testing operation of a spacecraft that may occur in space using other types of platforms may reduce the size of the physical infrastructure needed for testing.

For example, using a mobile platform that can move within the testing environment in a manner that emulates movement of the spacecraft in space may allow testing of the spacecraft that does not require the spacecraft to be launched into space and/or require a testing facility large enough to encompass the space-based vehicle. Further, the different advantageous embodiments recognize and take into account that testing a number of systems for the spacecraft as compared to testing the spacecraft may also reduce the time and/or resources needed for testing.

Thus, the different advantageous embodiments provide a method and apparatus for testing spacecraft and/or systems for spacecraft using a number of mobile platforms configured to operate in an environment. In one advantageous embodiment, an apparatus comprises a location reference system and a control module. The location reference system is configured to generate location information for a number of mobile platforms in an environment. The control module is configured to receive location information for the number of mobile platforms from the location reference system. The control module is further configured to generate command signals for the number of mobile platforms using the location information. The control module is further configured to send the command signals to the number of mobile platforms to operate the number of mobile platforms in the environment such that operation of the number of mobile platforms emulates operation of a number of spacecraft systems.

With reference now to FIG. 1, an illustration of a block diagram of a system for developing and testing spacecraft systems is depicted in accordance with an advantageous embodiment. In these illustrative examples, testing system 100 may be used to develop and test number of spacecraft systems 101. As used herein, a number of items means one or more items. In this manner, number of spacecraft systems 101 means one or more spacecraft.

In some illustrative examples, number of spacecraft systems 101 may include number of spacecraft 102, first number of systems 103 for number of spacecraft 102, or a combination thereof. A spacecraft in number of spacecraft 102 may be any vehicle or machine configured to travel and/or operate outside of the Earth's atmosphere. For example, number of spacecraft 102 may be configured to move and/or operate in non-Earth terrestrial environment 112.

In these illustrative examples, non-Earth terrestrial environment 112 may be any environment that is not an Earth terrestrial environment. An Earth terrestrial environment is defined as including at least one of the structural core, mantle, surface, atmosphere, and hydrosphere of the Earth. For example, non-Earth terrestrial environment 112 may include outer space, the atmosphere and/or surface of another planet, the moon, an asteroid, a comet, and/or some other environment. The suitable environment for non-Earth terrestrial environment 112 may be an environment that is not on the Earth, in a body of water of the Earth, or in the atmosphere of the Earth.

As used herein, the phrase "at least one of", when used with a list of items, means different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

In these illustrative examples, an operation in non-Earth terrestrial environment 112 may include, for example, at least one of traveling into, out of, and through non-Earth terrestrial environment 112. A spacecraft in number of spacecraft 102 may be selected from one of a space vehicle, a planetary rover, a satellite, a space shuttle, a planetary landing vehicle, an orbiting spacecraft, an Earth-orbiting spacecraft, a manned spacecraft, an unmanned spacecraft, a space station, a rocket, a space missile, a space probe, a space robot, and/or some other suitable type of spacecraft.

Further, first number of systems 103 for number of spacecraft 102 may be associated with number of spacecraft 102. This association is a physical association in these depicted examples. A first component, such as one of first number of systems 103, may be considered to be associated with a second component, such as one of number of spacecraft 102, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In these illustrative examples, first number of systems 103 for number of spacecraft 102 may include at least one of a sensor system, a position identification system, a camera system, a propulsion system, a thruster system, a docking system, a landing system, a movement system, a control system, an environmental system, a thermal protection system, a radiation protection system, a power system, a communications system, or some other suitable type of system in a spacecraft.

In these illustrative examples, testing system 100 includes environment 104, number of mobile platforms 106, control module 108, and location reference system 110. Environment 104 may be any type of environment in which number of mobile platforms 106 may be operated to emulate operation of number of spacecraft systems 101 in non-Earth terrestrial environment 112. Further, environment 104 also may include an environment that simulates one or more conditions of non-Earth terrestrial environment 112.

For example, environment 104 may be an enclosed testing environment, a laboratory, a testing facility, a low-gravity simulated environment, or some other suitable type of environment. In one illustrative example, environment 104 takes the form of testing chamber 109. Testing chamber 109 may be configured to simulate one or more conditions of non-Earth terrestrial environment 112. For example, without limitation, testing chamber 109 may simulate low-gravity conditions, a vacuum, extreme temperature conditions, extreme radiation conditions, and/or other types of conditions.

When number of spacecraft systems 101 includes first number of systems 103 associated with number of spacecraft 102, first number of systems 103 may move in non-Earth terrestrial environment 112 when number of spacecraft 102 moves in non-Earth terrestrial environment 112. Further, first number of systems 103 may also move in non-Earth terrestrial environment 112 independently of number of spacecraft 102.

Emulating the operation of number of spacecraft systems 101 in non-Earth terrestrial environment 112 using number of mobile platforms 106 involves operating number of mobile platforms 106 within environment 104 in a manner similar to the manner in which number of spacecraft systems 101 may operate in non-Earth terrestrial environment 112. Operating a mobile platform in number of mobile platforms 106, such as mobile platform 115, may include at least one of moving the mobile platform, stopping the mobile platform, reducing a speed of the mobile platform, increasing a speed of the mobile platform, resting the mobile platform, moving a structure on the mobile platform, causing the mobile platform to perform an operation, causing a structure on the mobile platform to perform an operation, and performing other types of operations.

In this illustrative example, emulation of the operation of number of spacecraft systems 101 in non-Earth terrestrial environment 112 may be performed, because conditions in non-Earth terrestrial environment 112 may not be the same conditions that may be present in an Earth terrestrial environment. For example, the conditions for non-Earth terrestrial environment 112 that may be different from an Earth terrestrial environment may include gravity conditions, atmospheric conditions, weather conditions, radiation conditions, electromagnetic conditions, solar pressure, solar flux, solar lighting, and/or other suitable conditions.

For example, number of mobile platforms 106 may operate in environment 104 in a manner that number of spacecraft systems 101 would operate if number of spacecraft systems 101 was in non-Earth terrestrial environment 112. In other words, different atmospheres, gravity, and other parameters that are different from environment 104 are taken into account when operating number of mobile platforms 106. For example, if a spacecraft system in number of spacecraft systems 101 applies a selected amount of thrust in a zero gravity environment, mobile platform 115 in number of mobile platforms 106 for the spacecraft system would move in environment 104 with the same speed and direction as the spacecraft would in the zero gravity environment.

Number of mobile platforms 106 may be configured to move on surface 113 of environment 104 in some illustrative examples. Surface 113 may be an even or uneven surface in these examples. For example, surface 113 may be constructed to represent terrain on a planet other than Earth in some cases. In other illustrative examples, number of mobile platforms 106 may be configured to move in air, on water, under water, and/or in some other suitable manner in environment 104.

Further, in these illustrative examples, mobile platform 115 is an example of one of number of mobile platforms 106. Mobile platform 115 may be any type of platform configured to move within environment 104. For example, a platform in number of mobile platforms 106 may be selected from one of a vehicle, a ground-based vehicle, an air-based vehicle, a space-based vehicle, a robot, a robotic arm, a machine, a mobile structure, a space robot, a space suit, a space platform, a space assembly, a space station, a planetary landing vehicle, a space device, and other suitable types of platforms.

For example, mobile platform 115 may be one of number of spacecraft 102 being tested for use in non-Earth terrestrial environment 112. In some examples, mobile platform 115 may be a vehicle configured to hold one of number of spacecraft 102 and/or one of first number of systems 103 being tested. For example, mobile platform 115 may be configured to hold a system in first number of systems 103 being tested for use in one or more of number of spacecraft 102 in non-Earth terrestrial environment 112.

In these illustrative examples, control module 108 is configured to control the movement of number of mobile platforms 106 within environment 104. Control module 108 may be implemented using hardware, software, or a combination of the two. For example, control module 108 may be implemented in computer system 111.

Computer system 111 may comprise a number of computers. When more than one computer is present, these computers may be in communication with each other. Further, a portion of these computers may be located within environment 104, while another portion of these computers may be located outside environment 104. As used herein, a portion of items, such as a portion of computers, may be zero, one, some, or all of the items. In other words, a portion of computers may be zero, one, some, or all of the computers.

Further, in these depicted examples, at least a portion of control module 108 may be located in environment 104, remotely from environment 104, and/or in number of mobile platforms 106. As one illustrative example, all of control module 108 may be located remotely from environment 104. As another illustrative example, a portion of control module 108 may be located in one or more of number of mobile platforms 106.

When control module 108 is located remotely from number of mobile platforms 106, control module 108 may be in communication with number of mobile platforms 106 using a number of communications links. In these illustrative examples, a communications link may be selected from one of, for example, wireless communications links, wired communications links, optical communications links, and/or other suitable types of communications links.

In these illustrative examples, control module 108 may be configured to move number of mobile platforms 106 such that the movement of number of mobile platforms 106 emulates the movement of number of spacecraft systems 101 in non-Earth terrestrial environment 112. For example, control module 108 is configured to send first command signals 114 to number of mobile platforms 106 to cause number of mobile platforms 106 to move in a manner that emulates number of spacecraft systems 101 moving in non-Earth terrestrial environment 112.

In these depicted examples, number of mobile platforms 106 may be configured to move in environment 104 with six degrees of freedom. However, in other illustrative examples, number of mobile platforms 106 may move with fewer degrees of freedom, such as, five degrees of freedom or four degrees of freedom. For example, a mobile platform in number of mobile platforms 106 may move along a plane in an x-direction and a y-direction and may rotate about an x-axis, a y-axis, and a z-axis, but the mobile platform does not move in the z-direction. Thus, in this depicted example, the mobile platform has five degrees of freedom.

Control module 108 may be configured to generate first command signals 114 using location information 117. In these illustrative examples, location information 117 may include position information 116 and/or orientation information 118 for number of mobile platforms 106 in environment 104. Control module 108 may receive location information 117 from location reference system 110. Location reference system 110 may be in communication with control module 108 using a number of communications links.

In these illustrative examples, location reference system 110 includes any number of devices configured to generate position information 116 and/or orientation information 118 for number of mobile platforms 106. Position information 116 may include, for example, number of positions 120 of number of mobile platforms 106 in environment 104 and/or data that control module 108 may use to identify number of positions 120.

A position in number of positions 120 for a mobile platform in number of mobile platforms 106 may be a three-dimensional position of the mobile platform with respect to some reference point or origin. The reference point may be within or outside of environment 104.

For example, the position of mobile platform 115 may be defined using coordinate system 122 for environment 104. Coordinate system 122 may be, for example, without limitation, a Cartesian coordinate system, a polar coordinate system, a geographic coordinate system, or some other suitable type of coordinate system.

In one illustrative example, location reference system 110 may include motion capture system 124. Motion capture system 124 may include, for example, a number of cameras configured to monitor number of positions 120 for number of mobile platforms 106 in environment 104 using a number of retro-reflective markers on number of mobile platforms 106. Motion capture system 124 may also be configured to monitor the movement of number of mobile platforms 106 in environment 104.

In these illustrative examples, location reference system 110 also may be configured to identify orientation information 118. Orientation information 118 may include number of orientations 126 for number of mobile platforms 106 or data that may be used to identify number of orientations 126 for number of mobile platforms 106.

An orientation in number orientations 126 for a mobile platform in number of mobile platforms 106 may be an angular rotation of the mobile platform with respect to a number of axes. In these illustrative examples, the number of axes is three axes. For example, the orientation of the mobile platform may be identified with respect to a pitch axis, a roll axis, and a yaw axis. In this example, the orientation of the mobile platform may also be referred to as an attitude of the mobile platform.

In this manner, control module 108 may use location information 117 to generate first command signals 114 to cause number of mobile platforms 106 to move in a manner that emulates movement of number of spacecraft systems 101 in space. In particular, first command signals 114 may be generated using position information 116 and/or orientation information 118 in location information 117 to create a closed-feedback loop.

For example, number of mobile platforms 106 moves in environment 104. Location reference system 110 generates location information 117 in response to this movement. Location information 117 may be generated continuously for number of mobile platforms 106 as number of mobile platforms 106 moves in environment 104.

Further, location reference system 110 sends location information 117 to control module 108. The information may be sent to control module 108 continuously as the information is generated. In the depicted example, control module 108 uses this information to generate and send first command signals 114. These command signals cause number of mobile platforms 106 to move in a same or different manner in environment 104. In this manner, a closed-feedback loop is present between number of mobile platforms 106, location reference system 110, and control module 108.

Further, location information 117 may be recorded as location information 117 and is generated by location reference system 110. Location information 117 may be recorded by data management module 130 in testing system 100. Data management module 130 may be implemented using hardware, software, or a combination of both.

Data management module 130 may be part of control module 108 in these illustrative examples. Of course, in other illustrative examples, at least a portion of data management module 130 may be a component separate from control module 108 within testing system 100. When data management module 130 is a separate component, data management module 130 may be in communication with location reference system 110 and/or control module 108 using a number of communications links.

In these illustrative examples, second number of systems 132 may be associated with number of mobile platforms 106. In particular, a system in second number of systems 132 may be associated with one or more of number of mobile platforms 106. Further, in some cases, one or more of second number of systems 132 may be associated with a mobile platform in number of mobile platforms 106.

Control module 108 may send first command signals 114 to second number of systems 132. First command signals 114 may be sent to second number of systems 132 to cause first number of systems 103 to emulate operation of first number of systems 103 in non-Earth terrestrial environment 112.

In other words, control module 108 may send first command signals 114 to second number of systems 132. These command signals cause second number of systems 132 to operate in environment 104 in a manner similar to the manner in which first number of systems 103 may operate when first number of systems 103 is associated with number of spacecraft systems 101 in non-Earth terrestrial environment 112. In these illustrative examples, second number of systems 132 may not be the same as first number of systems 103 when used with number of spacecraft 102 in non-Earth terrestrial environment 112.

In some illustrative examples, however, second number of systems 132 associated with number of mobile platforms 106 may include the same systems as first number of systems 103. In this manner, first number of systems 103 may be tested in environment 104 without first number of systems 103 being associated with number of spacecraft 102. First number of systems 103 and/or second number of systems 132 may include at least one of software and hardware in these illustrative examples.

In other illustrative examples, a system in second number of systems 132 may be a sub-system of number of spacecraft systems 101. For example, a system in second number of systems 132 may be a sub-system used in number of spacecraft 102. In one illustrative example, mobile platform 115 may be a ground-based robotic vehicle configured to carry a system in second number of systems 132. This system may be a sub-system used in number of spacecraft 102. In this manner, the sub-system may be tested without needing to test the type of spacecraft in which the sub-system is used.

As depicted, second number of systems 132 may be configured to generate data 135 during operation of first number of systems 103 and operation of number of mobile platforms 106 in environment 104. As depicted, data management module 130 may be configured to store data 135 in addition to location information 117 for number of mobile platforms 106.

As depicted, health monitoring module 136 may also be present in testing system 100. Health monitoring module 136 may be implemented in hardware, software, or a combination of the two. However, in other illustrative examples, at least a portion of health monitoring module 136 may be a component separate from control module 108.

Health monitoring module 136 is configured to receive health monitoring information 138 from number of mobile platforms 106. A portion of health monitoring information 138 may be received from second number of systems 132 associated with number of mobile platforms 106, depending on the implementation. Health monitoring information 138 may include, for example, operational characteristics, performance characteristics, sensor data, temperature data, and/or other suitable information for monitoring the health of number of mobile platforms 106 and/or second number of systems 132 associated with number of mobile platforms 106.

Health monitoring module 136 may be configured to monitor health condition 140 for number of mobile platforms 106 and/or second number of systems 132 associated with number of mobile platforms 106 using health monitoring information 138. Health condition 140 may be, for example, a health status. In this manner, health monitoring module 136 may monitor health condition 140, while number of mobile platforms 106 moves through environment 104.

As depicted, control module 108 uses health condition 140 to generate first command signals 114. In this manner, control module 108 may control the movement of number of mobile platforms 106 and/or the operation of second number of systems 132 associated with number of mobile platforms 106 based on health condition 140.

Additionally, in these depicted examples, control module 108 may include simulation module 142. Simulation module 142 is configured to generate simulated data 144. Simulated data 144 may be generated for first number of systems 103 for number of spacecraft 102 without using second number of systems 132 associated with number of mobile platforms 106.

In the illustrative examples, simulated data 144 is generated in response to simulation module 142 running simulations for the systems for number of spacecraft 102, while number of mobile platforms 106 moves within environment 104. In particular, operation of the systems for number of spacecraft 102 may be simulated using location information 117 recorded for number of mobile platforms 106, while number of mobile platforms 106 moves in environment 104.

In these illustrative examples, testing system 100 may be used to develop and test number of spacecraft systems 101 prior to number of spacecraft systems 101 being launched into non-Earth terrestrial environment 112. In other illustrative examples, testing system 100 may be used to test operation of number of spacecraft systems 101 when number of spacecraft systems 101 is already in non-Earth terrestrial environment 112. This development and testing of the number of systems in the different illustrative examples is part of managing the systems.

In one illustrative example, control module 108 may be configured to send second command signals 146 to number of spacecraft 102 to control the operation of number of spacecraft 102 in non-Earth terrestrial environment 112 based on the testing of number of mobile platforms 106 in environment 104. In some illustrative examples, first command signals 114 sent to number of mobile platforms 106 may be used to generate second command signals 146.

Control module 108 may include command control interface 147 that is configured to generate commands for specific mobile platforms in number of mobile platforms 106. These commands take the form of first command signals 114 in the illustrative examples. In other words, first command signals 114 are in a form that is useable by number of mobile platforms 106 in which different mobile platforms in number of mobile platforms 106 may use commands in different formats. In a similar fashion, command control interface 147 may generate second command signals 146 in a format that is used by specific number of spacecraft systems 101.

For example, control module 108 sends second command signals 146 to number of spacecraft 102 to coordinate more than one of number of spacecraft 102 in non-Earth terrestrial environment 112 based on first command signals 114 sent to number of mobile platforms 106 to coordinate more than one of number of mobile platforms 106. Further, second command signals 146 may be sent to number of spacecraft 102 to coordinate number of spacecraft 102 to perform a number of tasks for a particular mission.

In some illustrative examples, testing system 100 may be used to test first number of systems 103 for number of spacecraft 102 prior to these systems being associated with number of spacecraft 102 in non-Earth terrestrial environment 112. For example, one or more of first number of systems 103 for number of spacecraft 102 may be tested prior to these systems being sent into non-Earth terrestrial environment 112 for installation in number of spacecraft 102.

Further, in some illustrative examples, testing system 100 may be used to test first number of systems 103 for number of spacecraft 102 using second number of systems 132 after second number of systems 132 is already in non-Earth terrestrial environment 112. In other illustrative examples, testing may be performed to determine whether movement of number of mobile platforms 106 affects operation of second number of systems 132 associated with number of mobile platforms 106. These effects may be analyzed by control module 108 to determine effects of the movement of number of spacecraft 102 in non-Earth terrestrial environment 112 on first number of systems 103.

The illustration of testing system 100 in FIG. 1 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, testing system 100 may include other components in addition to, or in place of the components described above. As one illustrative example, testing system 100 may include an imaging system configured to generate images and/or video of the movement of number of mobile platforms 106 in environment 104.

In other illustrative examples, one or more of the components described above for testing system 100 may not be present in testing system 100. For example, in some cases, health monitoring module 136 may not be present in testing system 100.

In some illustrative examples, the system in second number of systems 132 associated with mobile platform 115 may be removable and replaced with a different system in second number of systems 132. In this manner, mobile platform 115 may be used to test one or more systems in second number of systems 132. Further, mobile platform 115 may be moved to various locations to test various systems.

As another example, control module 108 may include command control interface 147, which may be configured to generate commands for specific platforms for other uses other than testing spacecraft or other vehicles in non-Earth terrestrial environment 112. For example, command control interface 147 may be used to generate commands for other types of platforms. The platforms may be, for example, without limitation, ones used in a manufacturing environment.

For example, command control interface 147 may generate commands for platforms used in manufacturing environments in which restricted access areas, extreme temperature conditions, extreme radiation conditions, and/or other types of conditions may be present. Further, command control interface 147 may generate commands to operate platforms in a manufacturing environment when manufacturing requirements for speed and/or cost are present.

In a manufacturing environment, these platforms may be computer numerical controlled machines, robots configured to perform manufacturing operations, vehicles configured to test components and assemblies, automated tools, and other suitable types of platforms. For example, the platforms may be vehicles with at least one of eddy current testing systems, ultrasonic testing systems, camera systems, and other types of sensors. As another example, the platforms may include tools, such as a drill, a fastener system, a sealing system, and other suitable types of tools configured to perform operations in a manufacturing environment.

The platforms may be used in environments that preclude or limit the presence of human operators. For example, the environment may be one that has at least one of radiation, heat, toxic gases, biohazards, and other conditions unsuitable for human operators. For example, the platforms may be ones that are used in nuclear reactors in locations where human operators are unable to enter where access is limited.

Also, control module 108 and command control interface 147 may be used in inspection environments. For example, command control interface 147 may be used with platforms that move on objects to perform inspection of the objects. For example, the platforms may be controlled to perform nondestructive evaluation testing of an object, such as, for example, without limitation, an aircraft, a spacecraft, a ship, a space station, a building, a dam, and other suitable platforms.

Figure 2:
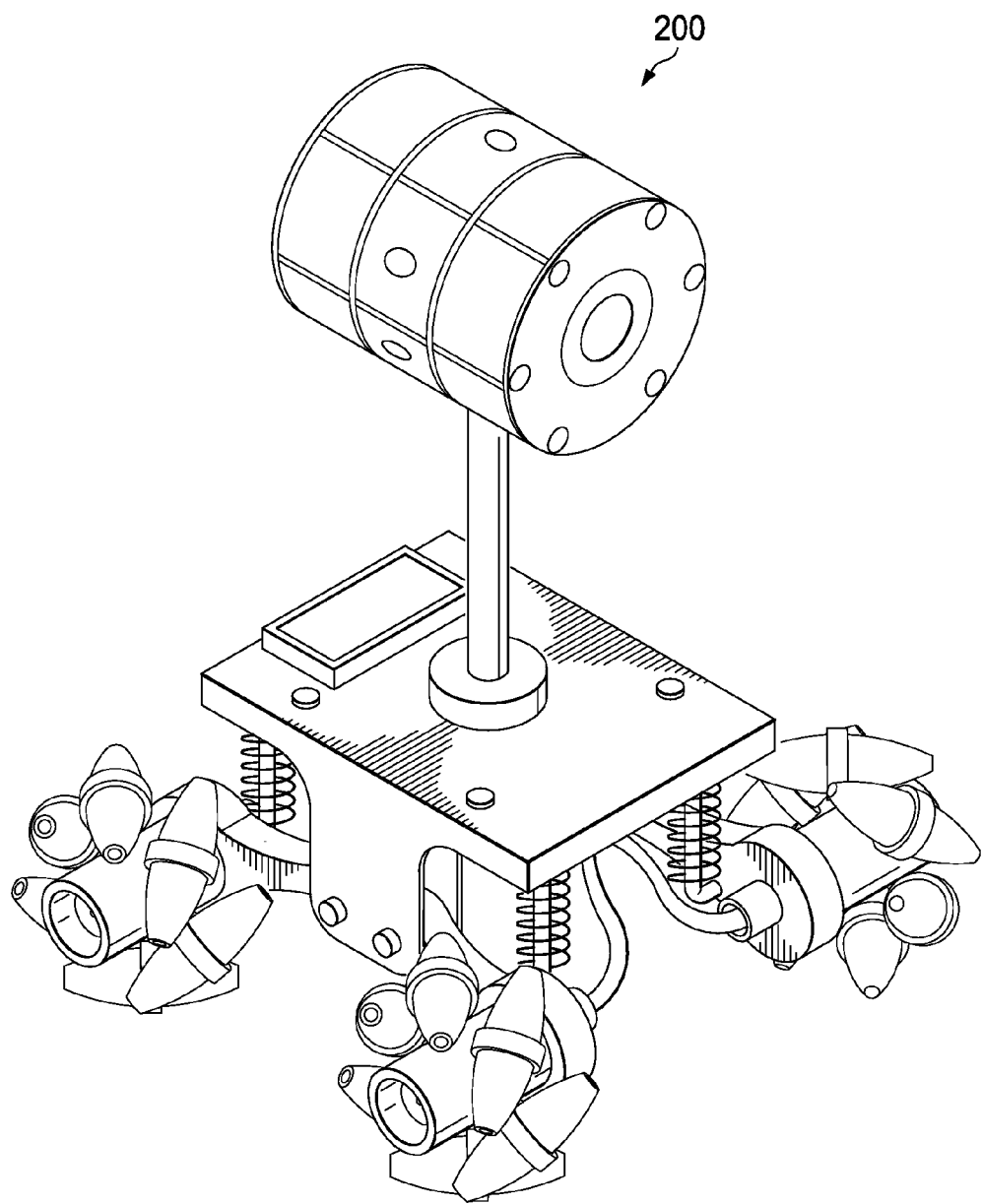
FIG. 2 is an illustration of a robotic vehicle in accordance with an advantageous embodiment.

With reference now to FIG. 2, an illustration of a robotic vehicle is depicted in accordance with an advantageous embodiment. In this illustrative example, robotic vehicle 200 is an example of one physical implementation for mobile platform 115 in number of mobile platforms 106 in FIG. 1. Robotic vehicle 200 may be configured to emulate the movement of a satellite. For example, robotic vehicle 200 is configured to move in a manner that emulates movement of a satellite in orbit around a planet other than Earth.

Figure 3:
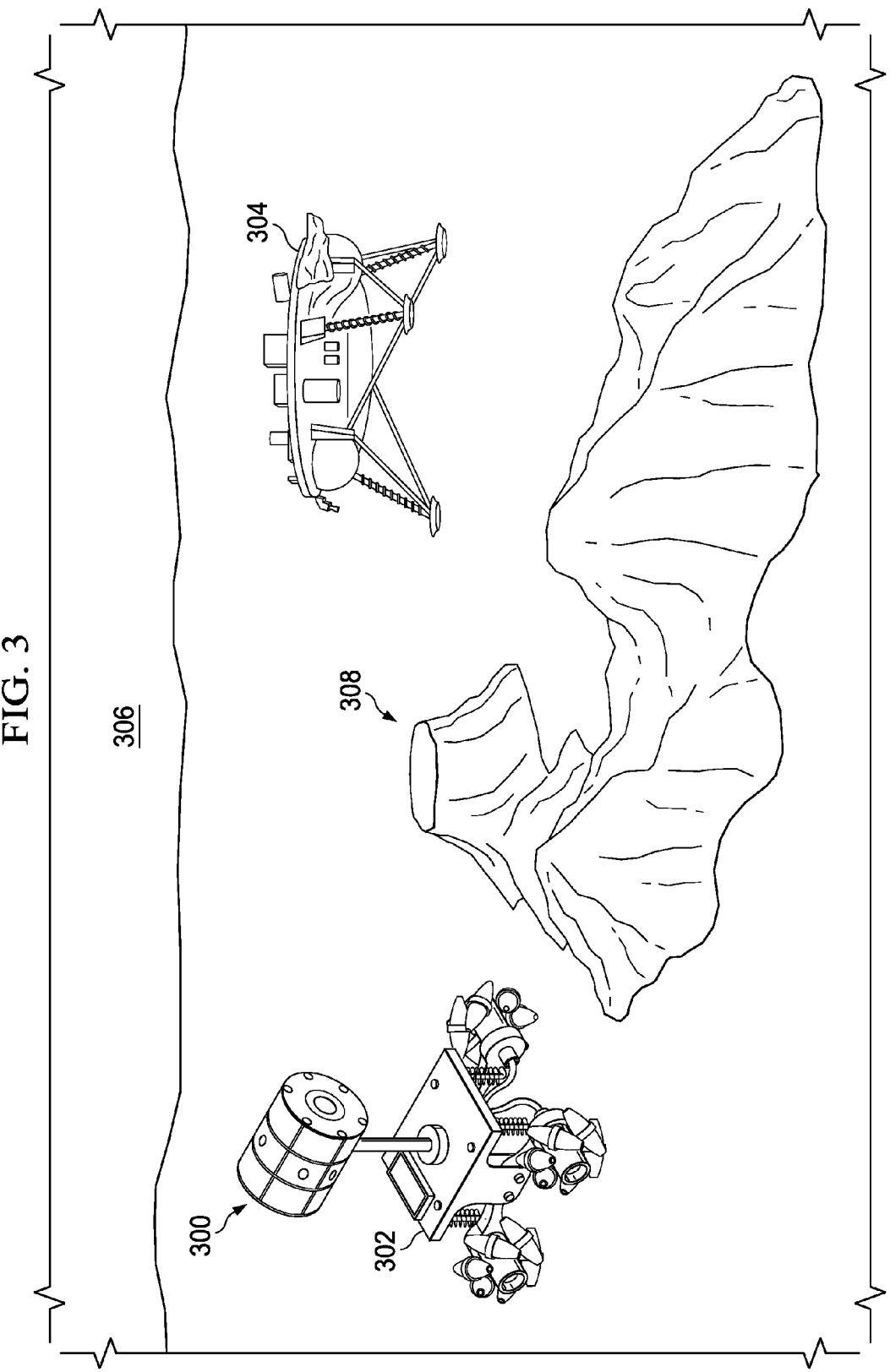
FIG. 3 is an illustration of a number of mobile platforms in an environment in accordance with an advantageous embodiment.

With reference now to FIG. 3, an illustration of a number of mobile platforms in an environment is depicted in accordance with an advantageous embodiment. In this illustrative example, number of mobile platforms 300 includes robotic vehicle 302 and robotic vehicle 304. Robotic vehicle 302 is a ground-based robot in this illustrative example. Robotic vehicle 304 is an aerial vehicle in this illustrative example.

As depicted, robotic vehicle 302 and robotic vehicle 304 are configured to move within environment 306. In particular, robotic vehicle 302 is configured to move on surface 308 of environment 306. Surface 308 is an uneven surface in this illustrative example. Further, robotic vehicle 304 is configured to fly over surface 308 of environment 306 in this depicted example.

Figure 4:
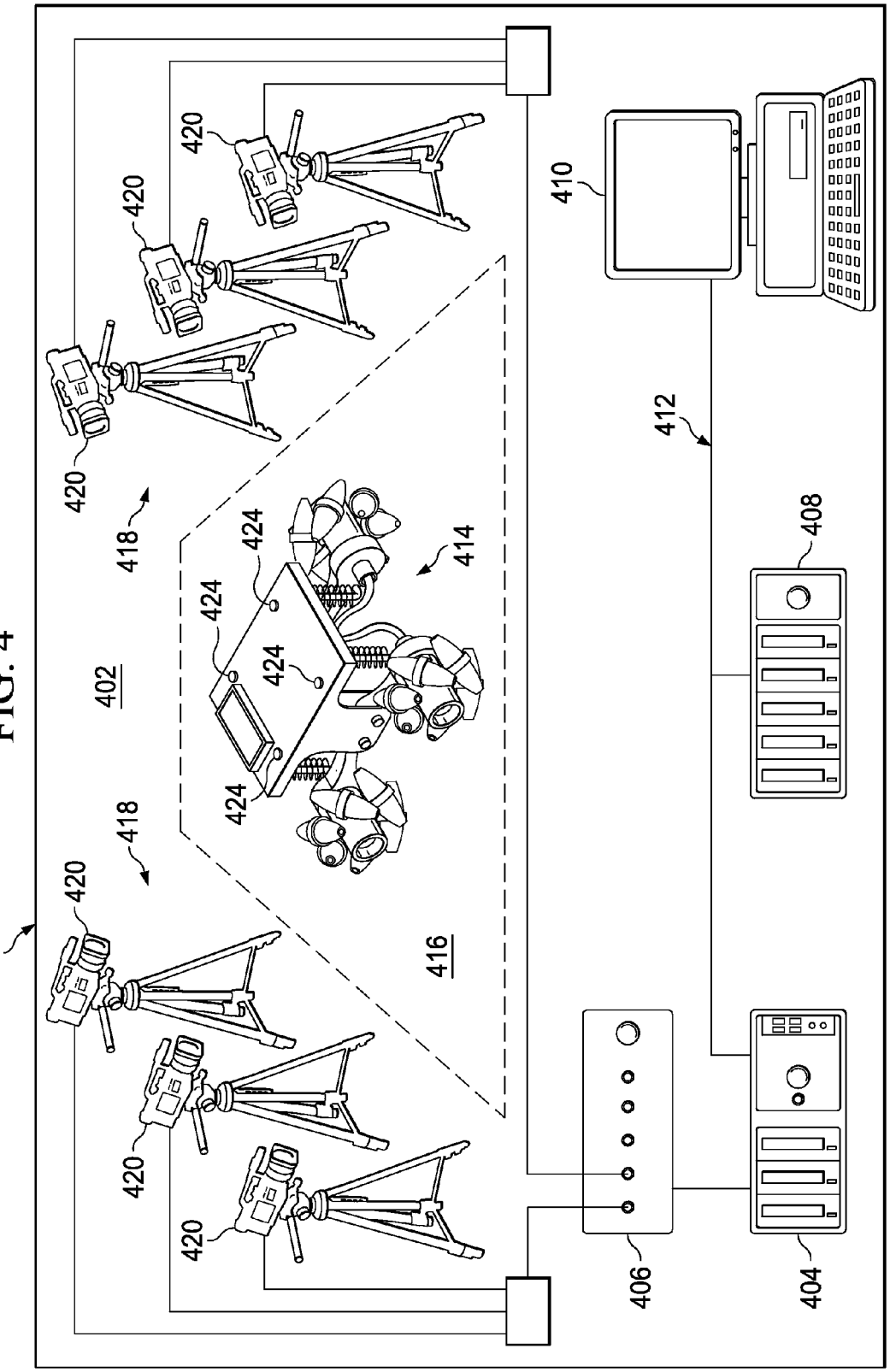
FIG. 4 is an illustration of a testing system in accordance with an advantageous embodiment.

With reference now to FIG. 4, an illustration of a testing system is depicted in accordance with an advantageous embodiment. In this illustrative example, testing system 400 is an example of one implementation for testing system 100 in FIG. 1. As depicted, testing system 400 includes environment 402, control module 404, and location reference system 406.

In this illustrative example, environment 402 is an enclosed testing environment. Control module 404 is implemented in a data processing system in this illustrative example. Further, control module 404 is coupled with data station 408 and computer 410 using communications link 412. In this illustrative example, communications link 412 may be an Ethernet connection.

As depicted, test vehicle 414 is configured to move within area 416 of environment 402. Test vehicle 414 may be an example of one implementation for mobile platform 115 in FIG. 1. In these illustrative examples, a single test vehicle is depicted for exemplary purposes. However, more than one test vehicle may be tested in environment 402 using control module 404.

The movement of test vehicle 414 within environment 402 is monitored using motion capture system 418. Motion capture system 418 is an example of one implementation for motion capture system 124 in FIG. 1. As depicted, motion capture system 418 includes plurality of motion capture devices 420. In this illustrative example, plurality of motion capture devices 420 includes a plurality of cameras.

Plurality of motion capture devices 420 may be positioned around area 416 of environment 402 to monitor the position, orientation, and movements of plurality of retro-reflective markers 424 attached to test vehicle 414. In these illustrative examples, plurality of motion capture devices 420 is configured to generate images in the visible spectrum. However, in other illustrative examples, other types of devices may be used. For example, plurality of motion capture devices 420 may be configured to generate infrared images.

In this illustrative example, the images generated by plurality of motion capture devices 420 may be substantially real-time images. In other words, these images may be used to form a substantially real-time video of the movement of test vehicle 414 in area 416 of environment 402.

Plurality of motion capture devices 420 is configured to generate position information and orientation information for testing vehicle 414 in environment 402. Plurality of motion capture devices 420 is configured to send the position information and the orientation information for testing vehicle 414 for processing. In this illustrative example, the position information and orientation information may include the position and orientation of testing vehicle 414 in area 416 of environment 402.

In other illustrative examples, plurality of motion capture devices 420 may generate images in the form of substantially real-time video of the movement of testing vehicle 414 in environment 402. These images may then be sent to control module 404. Control module 404 may use these images to determine the position and orientation of testing vehicle 414 in area 416 of environment 402.

Control module 404 may use the position and orientation of testing vehicle 414 to generate command signals to control the movement of testing vehicle 414. These command signals may be sent to testing vehicle 414 over a number of wireless communications links.

In this illustrative example, control module 404 sends the command signals to testing vehicle 414 to move testing vehicle 414 in area 416 of environment 402 in a manner that emulates movement of a spacecraft in a non-Earth terrestrial environment. The position and orientation of testing vehicle 414 may be monitored continuously as testing vehicle 414 moves in environment 402 using motion capture system 418 and control module 404. In this manner, the movement of testing vehicle 414 may be controlled using a type of closed-feedback loop.

Control module 404 may be configured to send any images received from plurality of motion capture devices 420 to computer 410 in this illustrative example. In this manner, an operator may view the images being generated and/or position information generated using the images. These images and/or position information may be viewed in substantially real-time in this illustrative example. Further, an operator may use computer 410 to enter input that may be received by control module 404. This input may be used in generating the command signals to be sent to testing vehicle 414.

Figure 5:
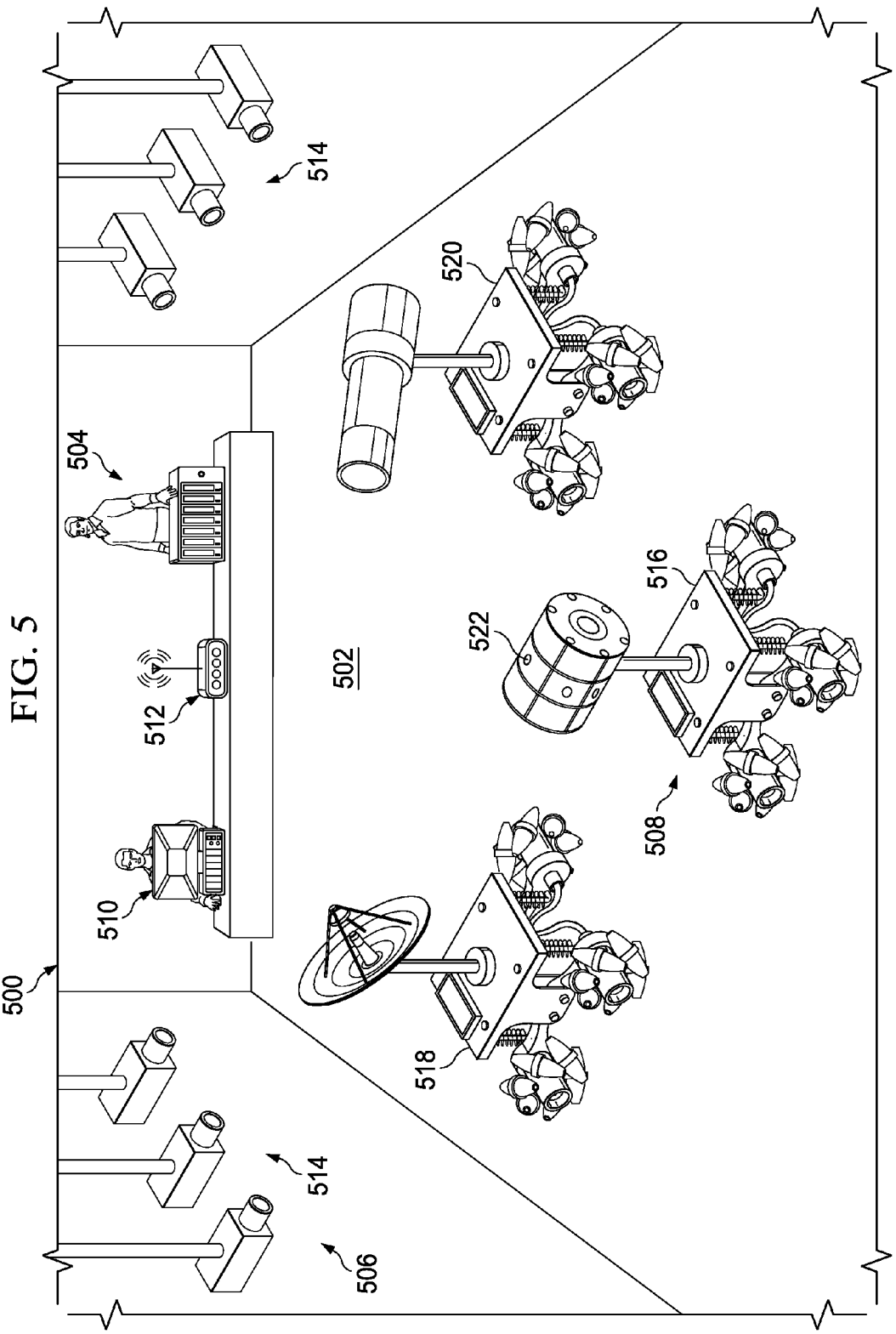
FIG. 5 is an illustration of a testing system in accordance with an advantageous embodiment.

With reference now to FIG. 5, an illustration of a testing system is depicted in accordance with an advantageous embodiment. In this illustrative example, testing system 500 is an example of one implementation for testing system 100 in FIG. 1. As depicted, testing system 500 includes environment 502, command and control station 504, location reference system 506, and testing vehicles 508.

In this illustrative example, environment 502 may be an enclosed environment. In particular, environment 502 may be within an enclosed building structure. Command and control station 504 may include computer system 510. Control module 512 may be implemented in computer system 510.

Location reference system 506 includes plurality of cameras 514. Plurality of cameras 514 may be distributed throughout environment 502 to monitor the position, orientation, and movement of testing vehicles 508 in environment 502. Location reference system 506 may generate and send position information and orientation information for testing vehicles 508 to control module 512 in computer system 510 in substantially real-time.

In this illustrative example, testing vehicles 508 include robotic vehicle 516, robotic vehicle 518, and robotic vehicle 520. These robotic vehicles may be configured to receive command signals from control module 512 in computer system 510. These command signals cause testing vehicles 508 to move within environment 502 in a manner that emulates the movement of a number of spacecraft in a non-Earth terrestrial environment.

In one illustrative example, robotic vehicle 516 may be associated with sensor system 522 that is configured for use on a spacecraft in a non-Earth terrestrial environment. Control module 512 may be used to move robotic vehicle 516 having sensor system 522 such that the effects of movement of robotic vehicle 516 on the operation of sensor system 522 may be monitored. In particular, data generated by sensor system 522 while robotic vehicle 516 is moved in environment 502 may be sent to control module 512 for processing.

Figure 6:
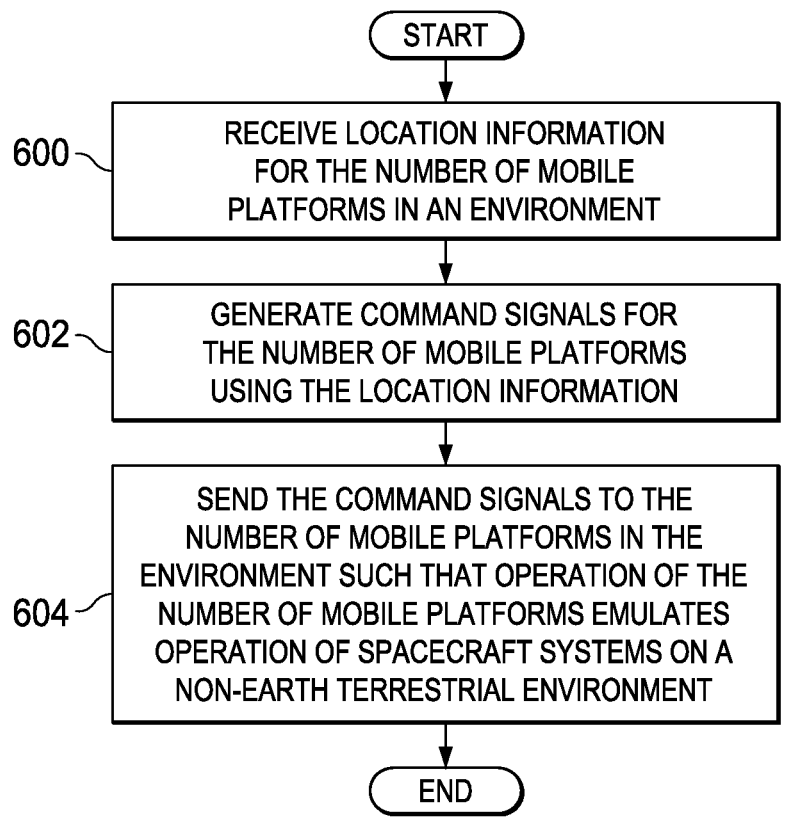
FIG. 6 is an illustration of a flowchart of a process for developing and testing spacecraft systems in accordance with an advantageous embodiment.

With reference now to FIG. 6, an illustration of a flowchart of a process for developing and testing spacecraft is depicted in accordance with an advantageous embodiment. The process illustrated in FIG. 6 may be implemented using testing system 100 in FIG. 1 to test number of spacecraft systems 101 in FIG. 1.

The process begins by receiving location information for the number of mobile platforms in an environment (operation 600). In operation 600, the location information includes position information and/or orientation information for the number of mobile platforms in an environment. The position information and/or the orientation information are received from a location reference system. The location reference system may be, for example, a motion capture system.

The process then generates command signals for the number of mobile platforms using the location information (operation 602). Thereafter, the process sends the command signals to the number of mobile platforms to operate the number of mobile platforms in the environment such that operation of the number of mobile platforms emulates operation of the number of spacecraft systems in a non-Earth terrestrial environment (operation 604), with the process terminating thereafter.

Figure 7:
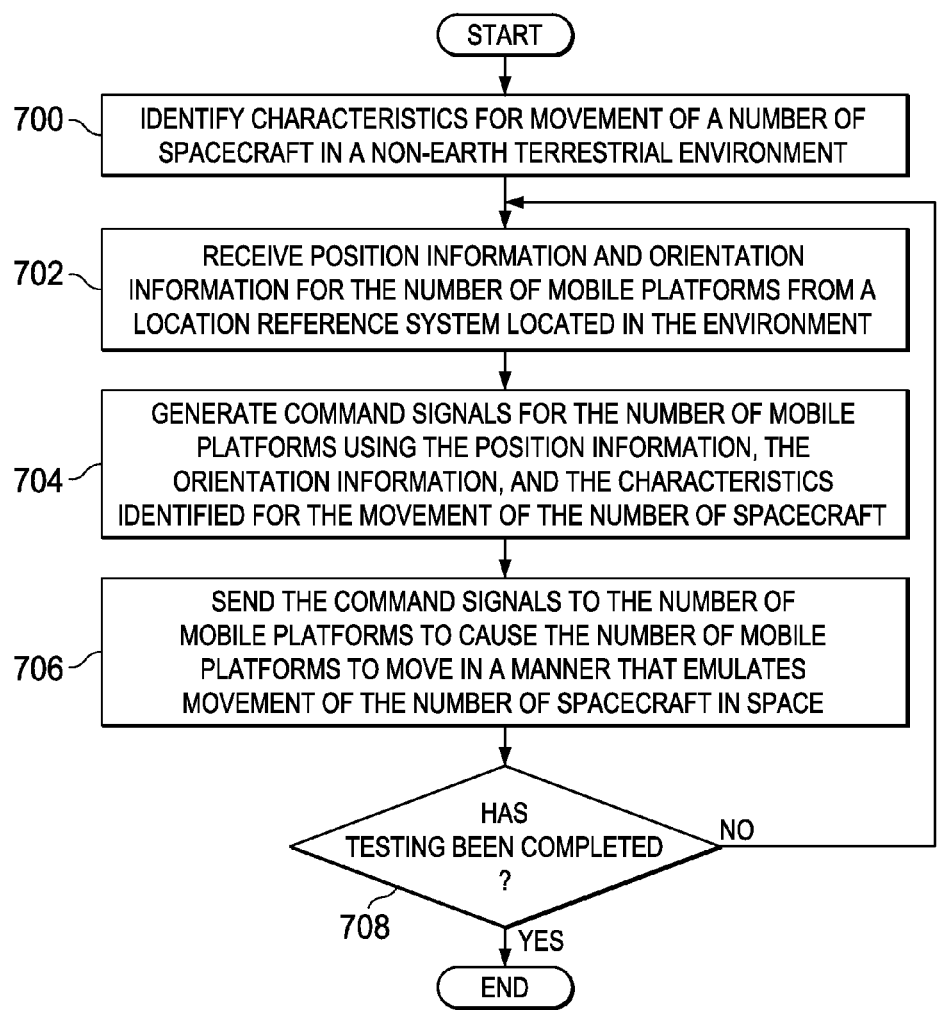
FIG. 7 is an illustration of a flowchart of a process for emulating the operation of spacecraft systems in space in accordance with an advantageous embodiment.

With reference now to FIG. 7, an illustration of a flowchart of a process for emulating the movement of spacecraft in a non-Earth terrestrial environment is depicted in accordance with an advantageous embodiment. The process illustrated in FIG. 7 may be implemented using testing system 100 in FIG. 1.

The process begins by identifying characteristics for movement of a number of spacecraft in the non-Earth terrestrial environment (operation 700). In operation 700, these characteristics may include, for example, mass properties of each spacecraft; the type of propulsion system on each spacecraft; characteristics about the propulsion system for each spacecraft; the type of attitude control system, position, and/or orientation of each spacecraft with respect to other spacecraft in the number of spacecraft; communication latency; sensor noise; the types of movement devices configured to move each spacecraft; stored energy capacity; position and orientation of each spacecraft relative to celestial bodies in space; and/or other suitable types of characteristics.

Further, in operation 700, the identification of characteristics for the movement of the number of spacecraft may take into account a number of conditions for the non-Earth terrestrial environment. These conditions may be conditions in the non-Earth terrestrial environment that may affect the movement of the number of spacecraft in the non-Earth terrestrial environment. Space environments and effects may include, for example, without limitation, gravity conditions, atomic oxygen, solar electromagnetic conditions, ionizing radiation, meteor and orbital debris, spacecraft-related contamination, and/or other conditions of the environment.

Next, the process receives position information and orientation information for the number of mobile platforms from a location reference system located in the environment (operation 702). The process then generates command signals for the number of mobile platforms using the position information, the orientation information, and the characteristics identified for the movement of the number of spacecraft (operation 704).

Thereafter, the process sends the command signals to the number of mobile platforms to cause the number of mobile platforms to move in a manner that emulates movement of the number of spacecraft in space (operation 706).

The process then determines whether testing has been completed (operation 708). If testing has been completed, the process terminates. Otherwise, if testing has not been completed, the process returns to operation 702 as described above. When the process described in FIG. 7 is used to send commands to a number of platforms for a manufacturing process, the process described in FIG. 7 may continue until the manufacturing process has been completed.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 8, an illustration of a data processing system is depicted in accordance with an advantageous embodiment. In this illustrative example, data processing system 800 may be used to implement one or more computers in computer system 111 in FIG. 1. Data processing system 800 includes communications fabric 802, which provides communications between processor unit 804, memory 806, persistent storage 808, communications unit 810, input/output (I/O) unit 812, and display 814.

Processor unit 804 serves to execute instructions for software that may be loaded into memory 806. Processor unit 804 may be a number of processors, a multi-processor core, or some other type of processor, depending on the particular implementation. A number, as used herein with reference to an item, means one or more items. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user.

Instructions for the operating system, applications, and/or programs may be located in storage devices 816, which are in communication with processor unit 804 through communications fabric 802. In these illustrative examples, the instructions are in a functional form on persistent storage 808. These instructions may be loaded into memory 806 for execution by processor unit 804. The processes of the different embodiments may be performed by processor unit 804 using computer-implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these examples. In one example, computer readable media 820 may be computer readable storage media 824 or computer readable signal media 826. Computer readable storage media 824 may include, for example, an optical or magnetic disk that is inserted or placed into a drive or other device that is part of persistent storage 808 for transfer onto a storage device, such as a hard drive, that is part of persistent storage 808.

Computer readable storage media 824 also may take the form of a persistent storage, such as a hard drive, a thumb drive, or a flash memory, that is connected to data processing system 800. In some instances, computer readable storage media 824 may not be removable from data processing system 800. In these examples, computer readable storage media 824 is a physical or tangible storage device used to store program code 818 rather than a medium that propagates or transmits program code 818. Computer readable storage media 824 is also referred to as a computer readable tangible storage device or a computer readable physical storage device. In other words, computer readable storage media 824 is a media that can be touched by a person.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 818 may be downloaded over a network to persistent storage 808 from another device or data processing system through computer readable signal media 826 for use within data processing system 800. For instance, program code stored in a computer readable storage medium in a server data processing system may be downloaded over a network from the server to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different advantageous embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 804 may take the form of a hardware unit that has circuits that are manufactured or configured for a particular use. This type of hardware may perform operations without needing program code to be loaded into a memory from a storage device to be configured to perform the operations.

For example, when processor unit 804 takes the form of a hardware unit, processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 818 may be omitted, because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 806, or a cache, such as found in an interface and memory controller hub that may be present in communications fabric 802.

Thus, the different advantageous embodiments provide a method and apparatus for testing spacecraft and/or systems for spacecraft using a number of mobile platforms configured to operate in a controlled environment. In one advantageous embodiment, an apparatus comprises a location reference system and a control module. The location reference system is configured to generate location information for a number of mobile platforms in an environment. The control module is configured to receive location information for the number of mobile platforms from the location reference system.

The control module is further configured to generate command signals for the number of mobile platforms using the location information. The control module is further configured to send the command signals to the number of mobile platforms to operate the number of mobile platforms in the environment such that operation of the number of mobile platforms emulates operation of a number of spacecraft systems.

In this manner, the different advantageous embodiments provide a system for testing spacecraft and/or systems for spacecraft that does not require the spacecraft to be launched into space. Further, this system allows spacecraft and/or systems for spacecraft to be tested without running simulations and/or testing fully-functional and fully-assembled prototypes, which may take more time than desired. As a result, the amount of time, effort, processing resources, and/or expense needed for testing spacecraft and/or spacecraft systems may be reduced.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a location reference system configured to generate location information comprising position and orientation information for a number of mobile platforms in an environment, the position information including a three dimensional position of a mobile platform with respect to a reference point, and the orientation information including an angular rotation of a mobile platform with respect to a number of axes;
a processor configured to identify characteristics for movement of a number of spacecraft in a non-Earth environment and to consider a number of conditions for the non-Earth environment in identifying the characteristics for movement; and
a control module configured to identify characteristics for movement of the number of mobile platforms in the non-Earth terrestrial environment, to receive the location and orientation information for the number of mobile platforms from the location reference system; to generate command signals for the number of mobile platforms using the location and orientation information and the characteristics identified for the movement of the number of mobile platforms and the characteristics for movement of the number of spacecraft; and to send the command signals to the number of mobile platforms to operate the number of mobile platforms in the environment such that operation of the number of mobile platforms emulates operation of the number of spacecraft systems in the non-Earth terrestrial environment, the command signals including commands to operate the number of mobile platforms on a surface representing terrain of the non-Earth terrestrial environment, at least a portion of the control module positioned remotely from the number of mobile platforms.

2. The apparatus of claim 1 further comprising:
the number of mobile platforms, wherein the number of mobile platforms is configured to operate within the environment to emulate the operation of the number of spacecraft systems when the number of spacecraft systems is operating in the non-Earth terrestrial environment, wherein the command signals include commands to operate the number of mobile platforms on an uneven surface representing terrain of the non-Earth environment and commands for the number of mobile platforms to fly over the surface, and wherein the location reference system;
the control module configured and to generate simulated data for a first number of systems for the number of spacecraft.

3. The apparatus of claim 2, wherein the number of spacecraft systems includes a first number of systems and further comprising:
a second number of systems associated with the number of mobile platforms, wherein the command signals are sent to the second number of systems to cause the second number of systems to emulate operation of the first number of systems in the non-Earth terrestrial environment, the simulated data for the first number of systems for the number of spacecraft generated without using the second number of systems associated with the number of mobile platforms.

4. The apparatus of claim 1 further comprising:
a data management module configured to record the location information for the number of mobile platforms in the environment.

5. The apparatus of claim 4, wherein the data management module is configured to store data generated by a second number of systems associated with the number of mobile platforms.

6. The apparatus of claim 1 further comprising:
a health monitoring module configured to receive health monitoring information from the number of mobile platforms and monitor a health condition for the number of mobile platforms based on the health monitoring information received, wherein the command signals are generated by the control module based on the health condition for the number of mobile platforms.

7. The apparatus of claim 1, wherein the command signals are first command signals and wherein the control module is configured to send second command signals to the number of spacecraft systems in the non-Earth terrestrial environment to control the operation of the number of spacecraft systems in the non-Earth terrestrial environment.

8. The apparatus of claim 1, wherein a system in the number of spacecraft systems comprises at least one of software and hardware and wherein the system in the number of spacecraft systems is selected from one of a sensor system, a position identification system, a camera system, a propulsion system, a thruster system, a docking system, a landing system, a movement system, a power system, a communication system, and a control system.

9. The apparatus of claim 3, wherein the first number of systems comprises at least one of software and hardware and wherein a system in the first number of systems and the second number of systems is selected from one of a sensor system, a position identification system, a camera system, a propulsion system, a thruster system, a docking system, a landing system, a movement system, a control system, a power system, and a communications system.

10. The apparatus of claim 1, wherein a spacecraft system in the number of spacecraft systems is selected from one of a space vehicle, a satellite, a space shuttle, a planetary landing vehicle, an orbiting spacecraft, an Earth-orbiting spacecraft, a manned spacecraft, an unmanned spacecraft, a space station, a rocket, a space missile, a space probe, a space robot, a space suit, a space platform, a space device, and a space assembly.

11. A system for developing and testing a number of spacecraft systems comprising:
a number of mobile platforms configured to operate within an environment to emulate operation of the number of spacecraft systems in a non-Earth terrestrial environment;
a location reference system configured to generate location information and orientation information for the number of mobile platforms in the environment, the location information including a three dimensional position of a mobile platform with respect to a reference point, and the orientation information including an angular rotation of a mobile platform with respect to a number of axes;

a health monitoring module configured to receive health monitoring information from the number of mobile platforms and to monitor a health condition for the number of mobile platforms using the health monitoring information received;

a processor configured to identify characteristics for movement of a number of spacecraft in a non-Earth environment and to consider a number of conditions for the non-Earth environment in identifying the characteristics for movement;

a control module configured to identify characteristics for movement of the number of mobile platforms in the non-Earth terrestrial environment, to receive the location information and the orientation information for the number of mobile platforms from the location reference system; to generate command signals for the number of mobile platforms using the location information, the orientation information, the characteristics for movement of the number of mobile platforms in the non-Earth terrestrial environment, the characteristics for movement of the number of spacecraft, and the health condition for the number of mobile platforms; to send the command signals to the number of mobile platforms to operate the number of mobile platforms in the environment such that operation of the number of mobile platforms emulates the operation of the number of spacecraft systems in the non-Earth terrestrial environment; and to generate simulated data for a first number of systems for the number of spacecraft, the command signals including commands to operate the number of mobile platforms on a surface representing terrain of the non-Earth terrestrial environment, at least a portion of the control module positioned remotely from the number of mobile platforms; and a data management module configured to record the location information for the number of mobile platforms in the environment.

12. The system of claim 11, wherein the number of spacecraft systems includes the first number of systems and further comprising:

a second number of systems associated with the number of mobile platforms, wherein the command signals are sent to the second number of systems to cause the second number of systems to emulate operation of the first number of systems when the first number of systems is operating in the non-Earth terrestrial environment, the simulated data for the first number of systems for the number of spacecraft generated without using the second number of systems associated with the number of mobile platforms.

13. The system of claim 11, wherein a spacecraft system in the number of spacecraft systems is selected from one of a space vehicle, a satellite, a space shuttle, a planetary landing vehicle, an orbiting spacecraft, an Earth-orbiting spacecraft, a manned spacecraft, an unmanned spacecraft, a space station, a rocket, a space missile, a space probe, a space robot, a space suit, a space platform, a space device, and a space assembly.

14. A method for testing a number of spacecraft systems, the method comprising:

a computer identifying characteristics for movement of a number of mobile platforms in a non-Earth terrestrial environment;

the computer configured to identify characteristics for movement of a number of spacecraft in the non-Earth terrestrial environment and to consider a number of conditions for the non-Earth terrestrial environment in identifying the characteristics for movement of the number of spacecraft;

the computer receiving location information and orientation information for the number of mobile platforms in an environment, wherein the location information and the orientation information are generated using a location reference system, the location information including a three dimensional position of a mobile platform with respect to a reference point, and the orientation information including an angular rotation of a mobile platform with respect to a number of axes;

the computer generating command signals for the number of mobile platforms using the location information, the orientation information, the characteristics for movement of the number of mobile platforms in the non-Earth terrestrial environment, and the characteristics for movement of the number of spacecraft;

the computer generating simulated data for a first number of systems for the number of spacecraft; and the computer sending the command signals to the number of mobile platforms to operate the number of mobile platforms in the environment such that operation of the number of mobile platforms emulates operation of the number of spacecraft systems in the non-Earth terrestrial environment, the command signals including commands to operate the number of mobile platforms on a surface representing terrain of the non-Earth terrestrial environment, at least a portion of the control module positioned remotely from the number of mobile platforms.

15. The method of claim 14, wherein the number of spacecraft systems comprises a first number of systems and wherein sending the command signals to the number of mobile platforms comprises:

the computer sending the command signals to a second number of systems associated with the number of mobile platforms to cause the second number of systems to emulate operation of the first number of systems in the non-Earth terrestrial environment, the simulated data for the first number of systems for the number of spacecraft generated without using the second number of systems associated with the number of mobile platforms.

16. The method of claim 14 further comprising:

the computer recording the location information for the number of mobile platforms in the environment.

17. The method of claim 15 further comprising:

the computer storing data generated by the second number of systems during operation of the second number of systems while the number of mobile platforms is moving in the environment.

18. The method of claim 14 further comprising:

the computer receiving health monitoring information from the number of mobile platforms;

the computer monitoring a health condition for the number of mobile platforms based on the health monitoring information received; and wherein the step of generating the command signals comprises:

the computer generating the command signals using the location information and the health condition for the number of mobile platforms.

19. The method of claim 14, wherein the command signals are first command signals and further comprising:

the computer sending second command signals to the number of spacecraft systems in the non-Earth terrestrial environment to control the operation of the number of spacecraft systems in the non-Earth terrestrial environment.

20. The method of claim 14, wherein a spacecraft in the number of spacecraft systems is selected from one of a space vehicle, a satellite, a space shuttle, a planetary landing vehicle, an orbiting spacecraft, an Earth orbiting spacecraft, a manned spacecraft, an unmanned spacecraft, a space station, a rocket, a space missile, a space probe, a space robot, a space suit, a space platform, a space device, and a space assembly.

\* \* \* \* \*